United States Patent
Kurashige et al.

(10) Patent No.: US 9,470,832 B2
(45) Date of Patent: Oct. 18, 2016

(54) PLANE ILLUMINATION APPARATUS AND BACKLIGHT APPARATUS

(75) Inventors: Makio Kurashige, Kashiwa (JP); Yasuyuki Ooyagi, Funabashi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 219 days.

(21) Appl. No.: 13/989,465

(22) PCT Filed: Nov. 25, 2011

(86) PCT No.: PCT/JP2011/077217
§ 371 (c)(1),
(2), (4) Date: May 24, 2013

(87) PCT Pub. No.: WO2012/070652
PCT Pub. Date: May 31, 2012

(65) Prior Publication Data
US 2013/0242606 A1    Sep. 19, 2013

(30) Foreign Application Priority Data
Nov. 26, 2010  (JP) .................... 2010-263915

(51) Int. Cl.
*F21V 8/00* (2006.01)
*G02B 5/32* (2006.01)
(Continued)

(52) U.S. Cl.
CPC .............. *G02B 6/0013* (2013.01); *G02B 5/32* (2013.01); *G02B 6/003* (2013.01); *G02B 6/0023* (2013.01);
(Continued)

(58) Field of Classification Search
CPC .. G02B 6/0013; G02B 6/2848; G02B 27/48; G02B 5/32; G02B 6/0023; G02B 6/0025

USPC ................... 362/609, 97.1–97.3; 359/15
See application file for complete search history.

(56) References Cited

U.S. PATENT DOCUMENTS

| 5,313,479 A | 5/1994 | Florence |
| 6,211,967 B1* | 4/2001 | Namizuka .............. 358/1.2 |

(Continued)

FOREIGN PATENT DOCUMENTS

| CN | 101790701 A | 7/2010 |
| JP | 06-208089 A1 | 7/1994 |

(Continued)

OTHER PUBLICATIONS

Joseph W. Goodman, "*Speckle Phenomena in Optics: Theory and Applications*," Chapter 6, Speckle in Certain Imaging Applications, Roberts & Co., 2006, pp. 187-233.

(Continued)

*Primary Examiner* — Karabi Guharay
(74) *Attorney, Agent, or Firm* — Burr & Brown, PLLC

(57) ABSTRACT

A plane illumination apparatus has an optical device, an irradiation unit to irradiate the coherent light beams to the optical device. The irradiation unit makes the coherent light beams scan the surface of the optical device by changing propagation directions of the coherent light beams, the light guide plate comprises a light take-out portion specific zone to take out coherent light beams to outside while making coherent light beams propagate between a first end face on which coherent light beams from the optical device are incident and a second end face that is provided to face the first end face, and the specific zone is provided inside the light take-out portion or along the first end face, or along the second end face.

11 Claims, 9 Drawing Sheets

(51) Int. Cl.
  *G03H 1/32*  (2006.01)
  *G02B 27/48*  (2006.01)
  *G02F 1/1335*  (2006.01)
  *G03H 1/22*  (2006.01)

(52) U.S. Cl.
  CPC .......... *G02B 6/0031* (2013.01); *G02B 6/0066* (2013.01); *G02B 27/48* (2013.01); *G03H 1/32* (2013.01); *G02B 6/0025* (2013.01); *G02F 1/133615* (2013.01); *G03H 2001/2292* (2013.01)

(56) References Cited

U.S. PATENT DOCUMENTS

| | | |
|---|---|---|
| 7,224,494 B2 | 5/2007 | Saitou et al. |
| 2009/0168134 A1 | 7/2009 | Nojima |
| 2009/0168424 A1 | 7/2009 | Yamauchi et al. |
| 2009/0244684 A1 | 10/2009 | Gollier |
| 2009/0303417 A1 | 12/2009 | Mizushima et al. |
| 2010/0045894 A1 | 2/2010 | Itoh et al. |
| 2010/0103497 A1 | 4/2010 | Rehn |
| 2010/0103676 A1 | 4/2010 | Noeth |
| 2010/0110517 A1* | 5/2010 | Shikii et al. ............... 359/207.1 |
| 2011/0026270 A1 | 2/2011 | Onishi |
| 2011/0228195 A1 | 9/2011 | Shikii et al. |
| 2013/0215486 A1* | 8/2013 | Noeth ....................... 359/197.1 |

FOREIGN PATENT DOCUMENTS

| | | |
|---|---|---|
| JP | 08-094852 A1 | 4/1996 |
| JP | 2002-169480 A1 | 6/2002 |
| TW | I224215 B | 11/2004 |
| WO | 2008/108068 A1 | 9/2008 |
| WO | 2009/116224 A1 | 9/2009 |
| WO | 2009/147808 A1 | 12/2009 |

OTHER PUBLICATIONS

International Search Report dated Feb. 28, 2012.
International Preliminary Report on Patentability dated Mar. 7, 2013.
Chinese Office Action (Application No. 201180056735.0) dated Nov. 3, 2014 (with English translation).
U.S. Appl. No. 13/989,543, filed May 24, 2013, Kurashige, et al.
Japanese Office Action (and translation provided by foreign counsel) from a corresponding Japanese patent application bearing a mailing date of Apr. 18, 2014, 4 pages.
Japanese Office Action (Application No. 2010-263915) dated Aug. 19, 2014 (with English translation).
Extended European Search Report (Application No. 11842892,9) dated Jul. 6, 2015.
Taiwanese Office Action (With English Translation), Taiwanese Application No. 20110143350, dated Apr. 20, 2015 (10 pages).
Japanese Reconsideration Report (Application No. 2010-263915) dated Jul. 6, 2015 (with English translation).
Japanese Office Action (Application No. 2010-263915) dated Jul. 8, 2016 (with English translation).

* cited by examiner

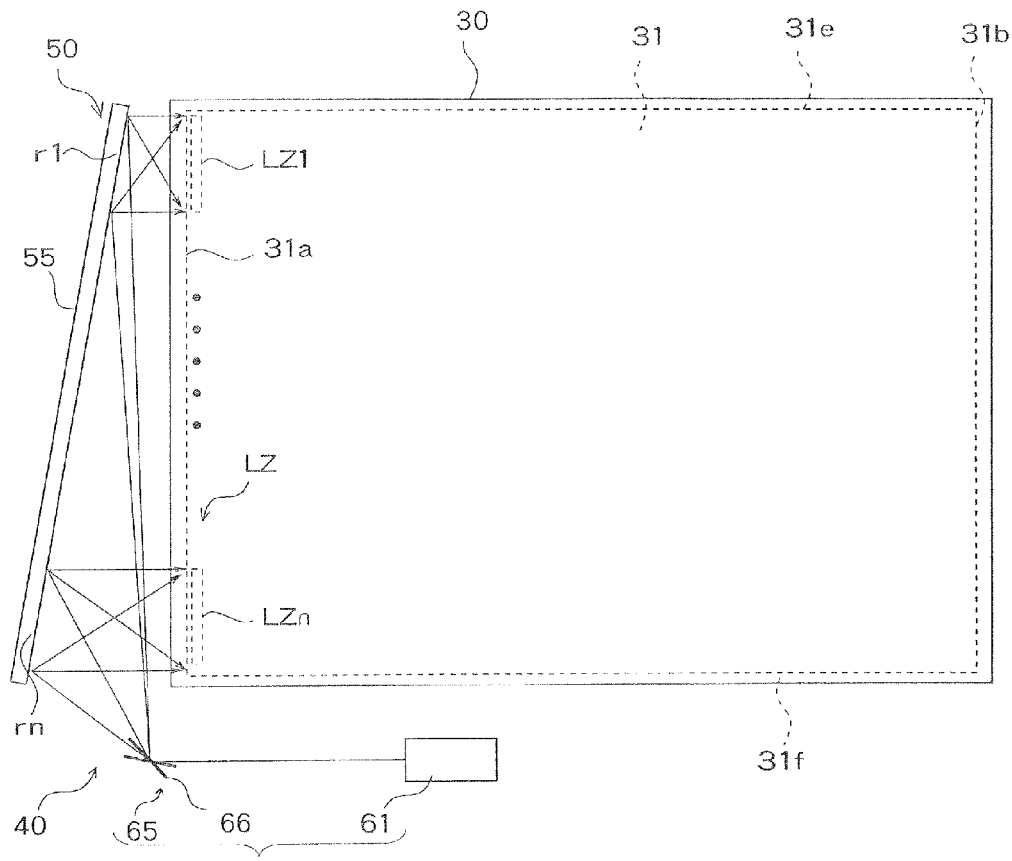
F I G. 2A
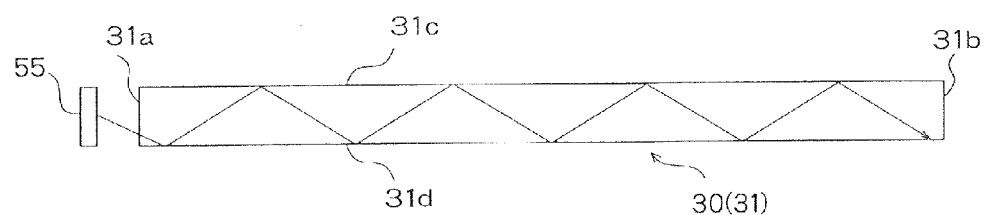
F I G. 2B

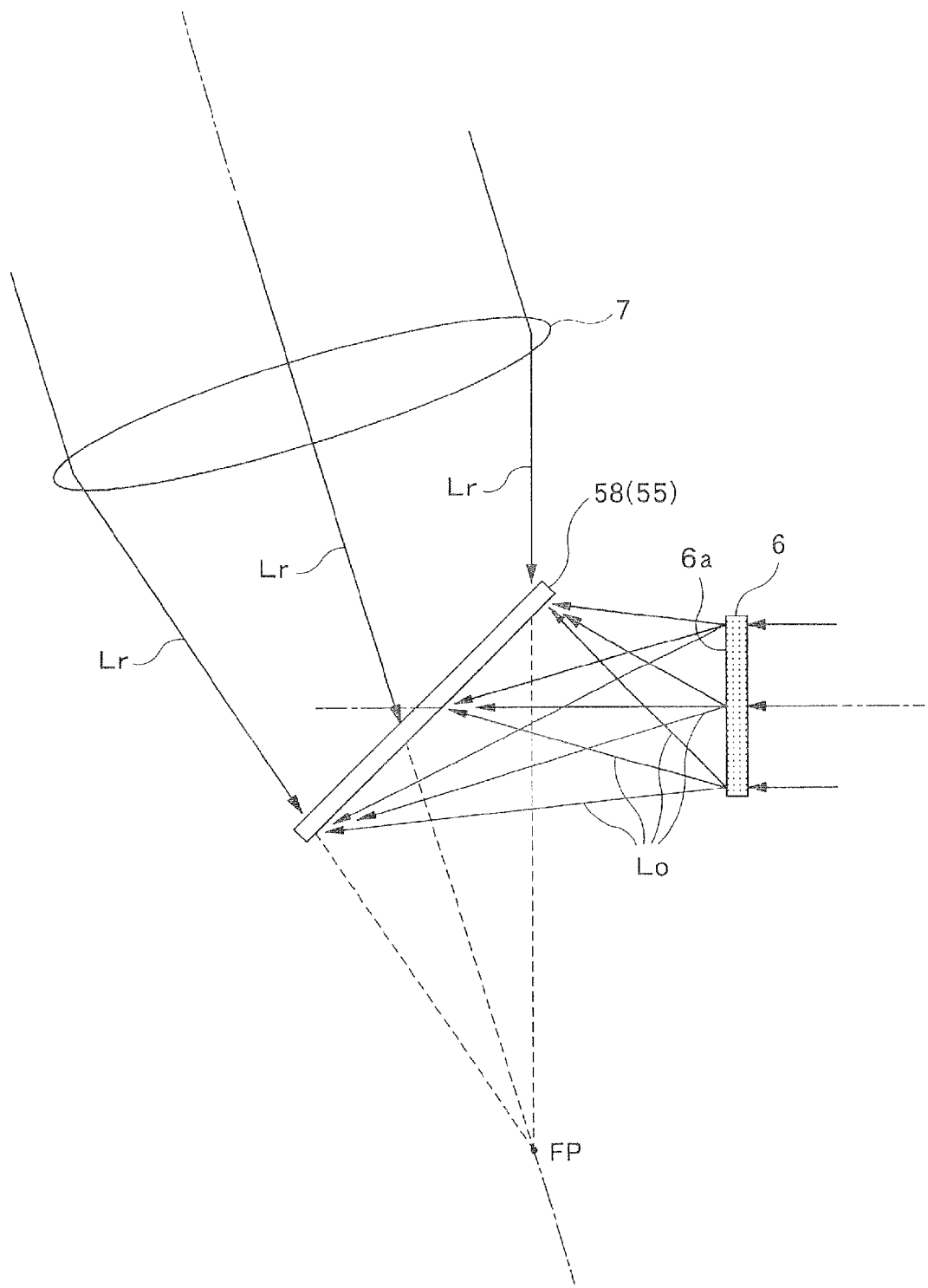
F I G. 4

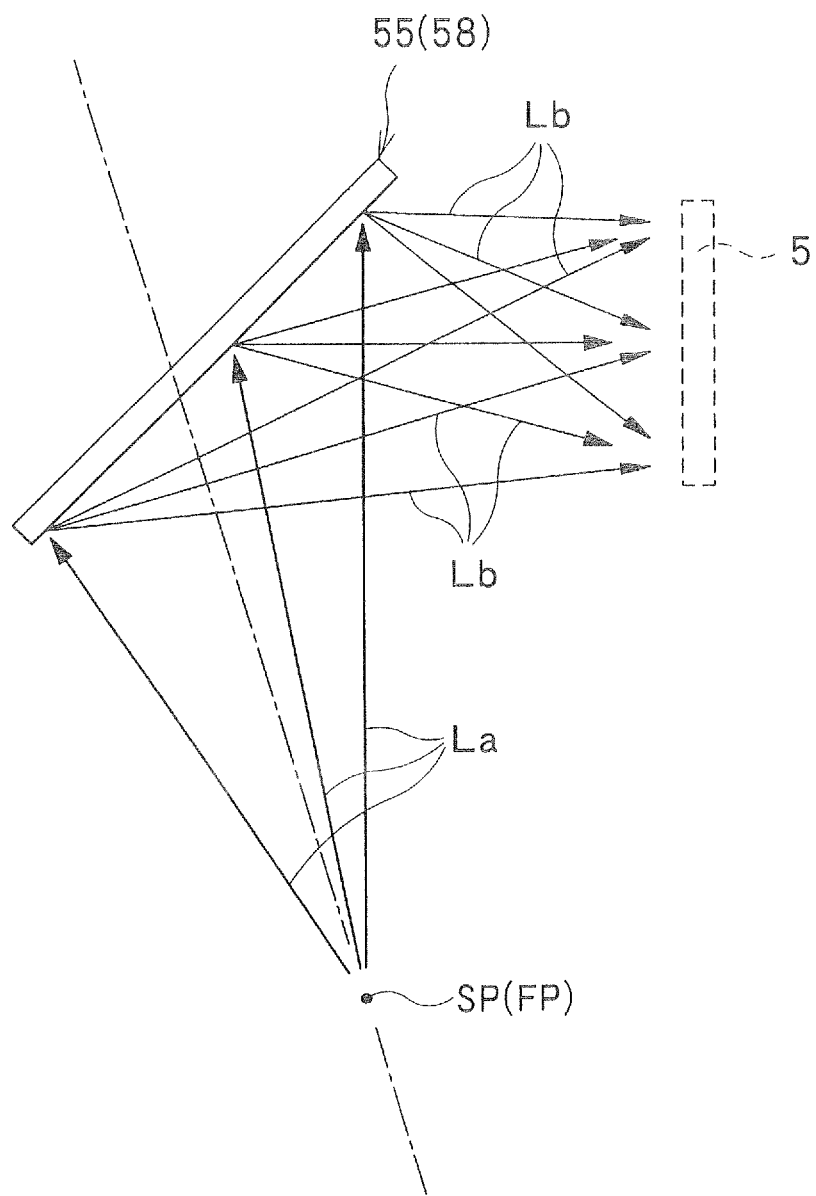
F I G. 5

SPECKLE CONTRAST COMPARISON
WITH AND WITHOUT LIGHT DIFFUSION DEVICE

| TYPE OF LIGHT SOURCE | | SPECKLE CONTRAST |
|---|---|---|
| (a) | LASER PARALLEL BEAM | 20.1 |
| (b) | BEAM SCANNING + VOLUME HOLOGRAM | 3.0 |
| (c) | BEAM SCANNING + CGH | 3.7 |
| (d) | SINGLE-COLOR LED | 4.0 |

F I G. 7

PLANE ILLUMINATION APPARATUS AND BACKLIGHT APPARATUS

BACKGROUND OF THE INVENTION

1. Field of the Invention

The present invention relates to a plane illumination apparatus and a backlight apparatus that use a light source for emitting coherent light beams.

2. Description of Related Art

As a backlight apparatus used in liquid crystal panels or the like, a system in which light is incident on an edge of a light guide plate, repeatedly reflected between two opposing surfaces by total reflection, and then taken out by a diffusion device or the like is known. This type of backlight apparatus includes backlight apparatuses using a cold cathode fluorescent lamp as a light source and also, recently, backlight apparatuses using an LED as a light source.

When a cold cathode fluorescent lamp is used, there is a problem in that it is difficult to make a backlight apparatus thin and power consumption increases. When an LED is used, although it is possible to make a backlight apparatus thin, since an LED is a uniform diffusion illumination device, it is difficult to make every light incident on a thin light guide plate with no leakage, hence loss is caused.

In contrast to above, a laser beam is excellent in straightness, and hence considered to improve light incidence efficiency.

However, when a laser beam is used as a light source, speckles due to high coherency of laser are generated. Speckles are a spotted pattern which is formed when a coherent light beam such as a laser beam is emitted to a scattering plane. If speckles are generated on a screen, they are observed as spotted luminance unevenness, i.e. brightness unevenness, thus becoming a factor of having physiologically adverse affect on an observer. It is considered that the reason why speckles are generated in the case of using coherent light beams is that coherent light beams reflected from respective portions of a scattering and reflecting plane such as a screen have very high coherency so that coherent light beams interfere with one another to generate speckles. For example, a theoretical review of the generation of speckles is made in detail in Speckle Phenomena in Optics, Joseph W. Goodman, Roberts & Co., 2006.

As discussed above, in the system using a coherent light source, since there is a problem of generation of speckles unique to the coherent light source, techniques for suppressing the generation of speckles have been proposed. For example, Japanese Patent Laid-Open No. 6-208089 discloses a technique in which a laser beam is emitted to a scattering plate, scattered light beams obtained therefrom are guided to a spatial light modulator, and the scattering plate is driven to rotate by a motor, thus reducing speckles.

SUMMARY OF THE INVENTION

Not only backlight apparatuses, speckles are problems in a variety of apparatuses having an illumination apparatus for illuminating an illumination zone with coherent light beams. Coherent light beams, for example laser beams as a typical example, show excellent straightness and can emit a light of extremely high energy density. Therefore, it is preferable for illumination apparatuses actually developed to design the optical path of coherent light beams in accordance with the characteristics of coherent light beams.

The inventors have extensively researched under consideration of the points discussed above, and as a result, the inventors have contrived the invention regarding a plane illumination apparatus and a backlight apparatus which illuminate a specific zone repeatedly with coherent light beams that are then diffused and taken out to the outside with speckles made inconspicuous. Moreover, the inventors have proceeded with researches and succeeded in improvement in the illumination apparatus to constantly prevent the generation of a region extremely bright in a specific zone illuminated with coherent light beams. Namely, the purpose of the present invention is to provide a plane illumination apparatus and a backlight apparatus that are capable of making speckles inconspicuous and effectively suppressing the generation of brightness unevenness in a specific zone.

In order to solve the problems above, according to an aspect of the present invention, there is provided a plane illumination apparatus comprising:

an optical device configured to be capable of diffusing coherent light beams from respective points to an entire region of the corresponding areas in a specific zone;

an irradiation unit configured to irradiate the coherent light beams to the optical device so that the coherent light beams scan a surface of the optical device; and a light guide plate configured to make coherent light beams that are reflected at a surface of the optical device or that have passed through the optical device propagate and to take out the coherent light beams to outside, wherein the irradiation unit makes the coherent light beams scan the surface of the optical device by changing propagation directions of the coherent light beams, the light guide plate comprises a light take-out portion configured to take out coherent light beams to outside while making coherent light beams propagate between a first end face on which coherent light beams from the optical device are incident and a second end face that is provided to face the first end face, and the specific zone is provided inside the light take-out portion or along the first end face, or along the second end face.

According to the present invention, it is possible to provide a plane illumination apparatus and a backlight apparatus that are capable of making speckles inconspicuous and effectively suppressing the generation of brightness unevenness in a specific zone.

BRIEF DESCRIPTION OF DRAWINGS

FIGS. 2A and 2B are views showing a schematic configuration of a plane illumination apparatus according to modifications of FIGS. 1A and 1B;

FIG. 4 is a view explaining a state in which an image of a scattering plate is formed on a hologram recording medium 55 as interference fringes;

FIG. 5 is a view explaining a state in which an image of a scattering plate is reproduced using interference fringes generated in the hologram recording medium 55 obtained through an exposure process of FIG. 4;

FIG. 7 is a view showing results of measuring speckle contrasts in the cases where the hologram recording medium 55 was used and not used;

DETAILED DESCRIPTIHON OF THE INVENTION

Hereinafter, embodiments of the present invention will be explained with reference to the drawings. In the accompanying drawings of the present description, in order for simplifying drawings and easy understanding, the scale, the ratio of height to width, etc., are appropriately modified or enlarged.

A plane illumination apparatus according to an embodiment of the present invention is applicable to a backlight apparatus to be installed into, for example, a liquid crystal panel or the like. However, not necessarily be limited to an application to a backlight apparatus, a plane illumination apparatus according to an embodiment of the present invention can be used as a plane illumination apparatus for illumination at a specific size of plane.

Figure 1A:
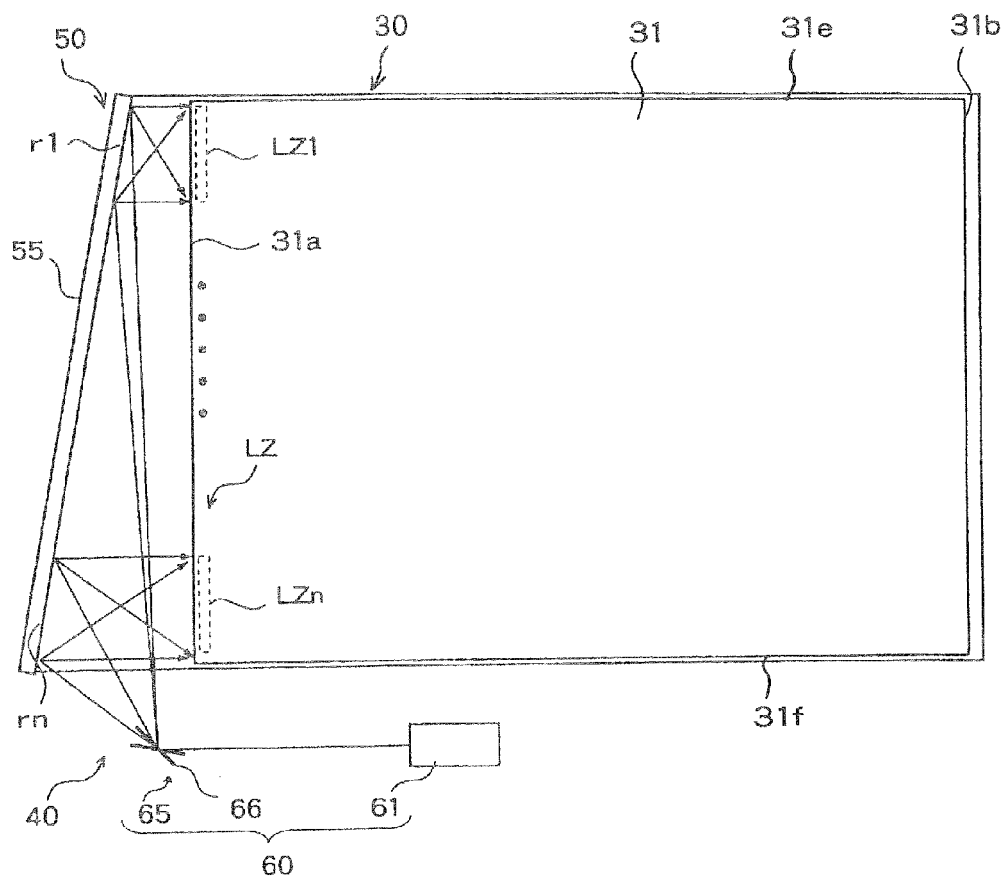
FIGS. 1A and 1B are views showing a schematic configuration of a plane illumination apparatus according to an embodiment of the present invention.
Figure 1B:
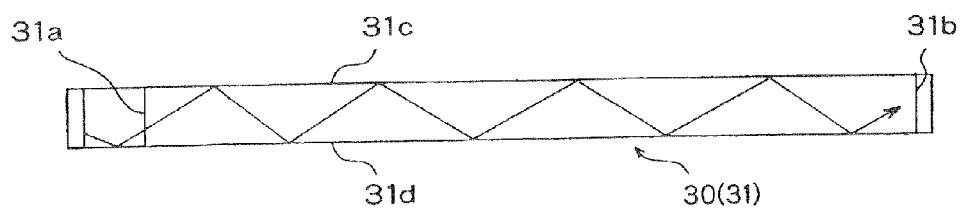

FIGS. 1A and 1B are views showing a schematic configuration of a plane illumination apparatus according to an embodiment of the present invention. FIG. 1(a) is a plan view and FIG. 1(b) is a sectional view of FIG. 1(a). The plane illumination apparatus shown in FIGS. 1A and 1B is provided with an optical device 50, an irradiation unit 60, and a light guide plate 30. In the present description, an apparatus provided with the optical device 50 and the irradiation unit 60 is referred to as an illumination apparatus 40 and an apparatus provided with the illumination apparatus 40 and the light guide plate 30 is referred to as a plane illumination apparatus.

The irradiation unit 60 irradiates the optical device 50 with coherent light beams so that the coherent light beams scan the surface of the optical device 50. The irradiation unit 60 has a laser source 61 that emits coherent light beams and a scanning device 65 that scans the surface of the optical device 50 with the coherent light beams emitted from the laser source 61.

The optical device 50 has a hologram recording medium 55 that can reproduce an image of a scattering plate in an illumination zone (a specific zone) LZ. The details of the hologram recording medium 55 will be explained later. A plurality of recording areas r1 to rn are provided on the hologram recording medium 55. Coherent light beams reflected by the scanning device 65 within different reflection angle ranges are incident on the plurality of recording areas r1 to rn. The coherent light beams scan the corresponding recording areas. An interference fringe is formed on each of the recording areas r1 to rn. When a coherent light beam is incident on each recording area, a coherent light beam diffracted by the interference fringe is emitted as diverging light (diffused light).

As described above, on each of the recording areas r1 to rn on the hologram recording medium 55, a coherent light beam from the scanning device 65 within the corresponding reflection angle range is incident and scans the recording area. The recording areas r1 to rn on the hologram recording medium 55 are arranged in tight contact with one end face of the light guide plate 30. At least part of the light guide plate 30 is provided with a light take-out portion 31. The light take-out portion 31 is provided with the illumination zone LZ to be illuminated with coherent light beams from the optical device 50.

Coherent light beams incident on respective points in the recording areas r1 to rn on the hologram recording medium 55 become diffused light and create line images LZ1 to LZn in the corresponding areas in the illumination zone LZ. For example, if there are an n number (n being an integer of 2 or more) of recording areas r1 to rn, line images LZ1 to LZn are created in the n number of corresponding areas in the illumination zone LZ.

The illumination zone LZ is provided inside the light take-out portion 31, along a first end face 31a closest to the optical device 50 or a second end face 31b farthest from the optical device 50.

As shown in FIG. 1(b), the light take-out portion 31 is provided with the first end face 31a on which coherent light beams from the optical device 50 are incident, the second end face 31b provided to face the first end face 31a, and third and fourth end faces 31c and 31d connected to the first and second end faces 31a and 31b. The light take-out portion 31 makes coherent light beams incident on the first end face 31a propagate towards the second end face 31b while reflecting the coherent light beams at the third and fourth end faces 31c and 31d, and takes out the coherent light beams little by little to the outside from the third end face 31c or the fourth end face 31d during propagation. In this way, the plane illumination apparatus functions to radiate light of uniform brightness from the enter region of the third end face 31c or the fourth end face 31d.

Diffused light beams from the recording areas r1 to rn on the hologram recording medium 55 are reflected at the opposing two surfaces of the light guide plate 30 by total reflection and reach the first end face 31a of the light take-out portion 31. Accordingly, diffused light beams from the hologram recording medium 55 are incident on the first end face 31a with almost no leakage.

In the present description, an example with the third end face 31c as a light take-out surface will be explained. For example, the light guide plate 30 is configured by sandwiching an acrylic plate with a scattering sheet and reflection sheet. On the reflection sheet, reflection dots are printed with a white ink. The scattering sheet corresponding to the third end face 31c is a light take-out surface. The reflection sheet corresponding to the fourth end face 31d is a reflection surface. By adjusting the density of the reflection dots on the reflection sheet, light of uniform brightness can be taken out from the scattering sheet side.

FIGS. 1A and 1B show an example in which the hologram recording medium 55 of the optical device 50 is provided in tight contact with the light guide plate 30. However, the hologram recording medium 55 and the light guide plate 30 are arranged apart from each other. FIGS. 2A and 2B are modifications of FIGS. 1A and 1B, showing a plane illumination apparatus having a hologram recording medium 55 and a light guide plate 30 arranged apart from each other. FIG. 2(a) is a plan view and FIG. 2(b) is a sectional view.

The light guide plate 30 of FIGS. 2A and 2B is provided with a light take-out portion 31 at the almost entire region. The light guide plate 30 has three end faces (second, fifth and sixth end faces 31b, 31e and 31f) as mirror surfaces, except for a first end face 31a that is an incidence surface for diffused light from an optical device 50, a light take-out surface (a third end face 31c), and a fourth end face 31d that faces the light take-out surface.

Diffused light from each of recording areas r1 to rn of the hologram recording medium 55 is directly incident on the light guide plate 30 at the first end face 31a side without being reflected anywhere and propagates towards the second end face 31b side while being reflected at the third and fourth end faces 31c and 31d.

While propagating, if part of light reaches the second, fifth and sixth end faces 31b, 31e and 31f, it is reflected by total reflection because these end faces are mirror surfaces. Therefore, it is possible to take out light efficiently from the light take-out surface (the third end face 31c). It is not always necessary that all of the second, fifth and sixth end faces 31b, 31e and 31f are a mirror surface. Any of these end faces may be a mirror surface.

It is preferable for the plane illumination apparatus of FIGS. 2A and 2B that, since the hologram recording medium 55 and the light guide plate 30 are apart from each other, a structural improvement is made at the incidence surface side of the light guide plate 30 in order that diffused light from the hologram recording medium 55 is easily incident on the light guide plate 30. For example, as an example, the light guide plate 30 may be configured to be thick at the diffused-light incidence surface side so that diffused light is easily incident thereon.

Also in the plane illumination apparatus of FIGS. 2A and 2B, like the plane illumination apparatus of FIGS. 1A and 1B, an illumination zone LZ is provided inside the light take-out portion 31, along the first end face 31a closest to the optical device 50 or the second end face 31b farthest from the optical device 50.

Also in the plane illumination apparatus of FIGS. 1A and 1B, like the plane illumination apparatus of FIGS. 2A and 2B, at least any one of the second, fifth and sixth end faces 31b, 31e and 31f may be a mirror surface.

Figure 3:
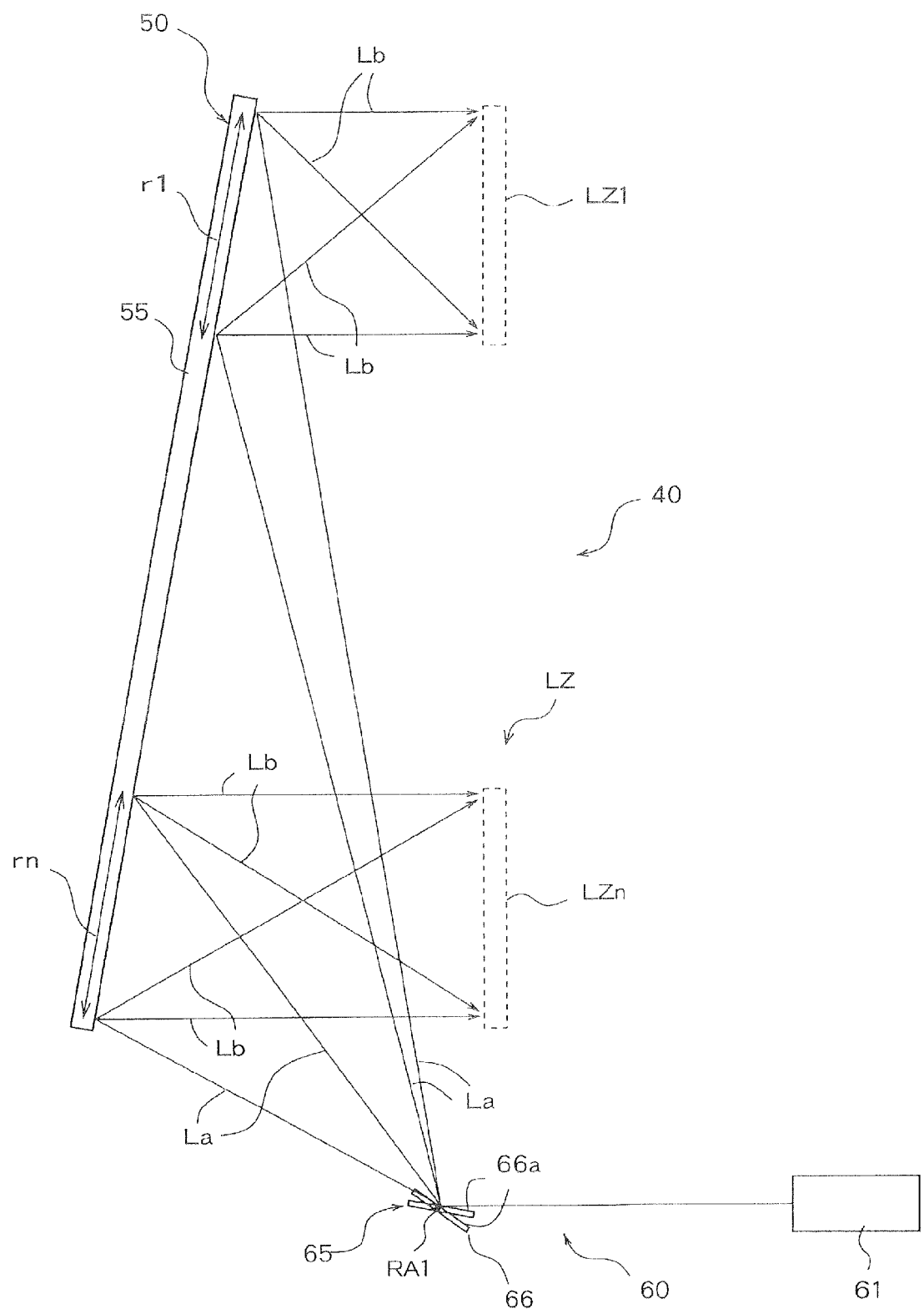
FIG. 3 is a view explaining the operational principle of an illumination apparatus 40 of FIGS. 1A and 1B.

FIG. 3 is a view explaining the operational principle of the illumination apparatus 40. In FIG. 3, for easy explanation, some components in the illumination apparatus 40 are only shown. Hereinafter, the basic operational principle of the illumination apparatus 40 will be explained using FIG. 3.

The hologram recording medium 55 of the optical device 50 can receive coherent light beams emitted from the irradiation unit 60 as reproduction illumination light beams La and diffract the coherent light beams at high efficiency. Above all, the hologram recording medium 55 is configured to be capable of reproducing an image 5 of a scattering plate 6 on the illumination zone LZ by diffracting coherent light beams incident on its respective positions, in other words, respective micro zones which should be called respective points.

The irradiation unit 60 is configured so that the optical device 50 uses coherent light beams emitted to the hologram recording medium 55 to scan the hologram recording medium 55. Therefore, at a moment, the irradiation unit 60 irradiates a micro zone on the surface of the hologram recording medium 55 with coherent light beams.

Coherent light beams emitted from the irradiation unit 60 to scan the hologram recording medium 55 are incident on respective positions, i.e. respective micro zones on the hologram recording medium 55 at incident angles that satisfy diffraction requirements of the hologram recording medium 55. Coherent light beams incident on respective positions of the hologram recording medium 55 from the irradiation unit 60 are diffracted by the hologram recording medium 55 to illuminate the specific zones that are overlapped with one another at least partially. Above all in the embodiment described here, coherent light beams incident on respective positions of the hologram recording medium 55 from the irradiation unit 60 are diffracted by the hologram recording medium 55 to illuminate the same illumination zone LZ. In more detail, as shown in FIG. 3, a coherent light beam incident on any position in each of the recording areas r1 to rn of the hologram recording medium 55 from the irradiation unit 60 reproduces an image 5 of a scattering plate 6 in a manner that the image is superimposed on the corresponding area in illumination zone LZ. Namely, coherent light beams incident on any respective positions in the recording areas r1 to rn of the hologram recording medium 55 from the irradiation unit 60 are diffused, i.e. spread by the optical device 50 to be incident on the corresponding areas of the illumination zone LZ to create line images LZ1 to LZn, respectively.

As for the hologram recording medium 55 that enables the diffraction of coherent light beams described above, in the example shown, a reflection-type volume hologram using photopolymer is used. FIG. 4 is a view explaining a state in which an image of a scattering plate is generated on the hologram recording medium 55 as interference fringes. Here, the scattering plate 6 is a reference member for scattering light and it does not matter what a configuration the scattering plate 6 has.

As shown in FIG. 4, the hologram recording medium 55 is produced using scattered light beams from an actual scattering plate 6 as object beams Lo. FIG. 4 shows a state in which a hologram photosensitive material 58 that shows photosensitivity to become the hologram recording medium 55 is exposed by reference beams Lr and object beams Lo, both being coherent light beams that show coherence to each other.

As for the reference beams Lr, for example, laser beams from the laser source 61 that oscillates laser beams in a specific wavelength range are used. The reference beams Lr pass through a condenser element 7 made of a lens and are incident on the hologram photosensitive material 58. In the example shown in FIG. 4, laser beams to become the reference beams Lr are incident on the condenser element 7 as a parallel light flux that is parallel with the optical axis of the condenser element 7. By passing through the condenser element 7, the reference beams Lr are reshaped, i.e. converted, from a parallel light flux into a convergent light flux and incident on the hologram photosensitive material 58. On this occasion, a focal point FP of the convergent light flux Lr is located at a position beyond the hologram photosensitive material 58. In other words, the hologram photosensitive material 58 is located between the condenser element 7 and the focal point FP of the convergent light flux Lr collected by the condenser element 7.

Next, the object beams Lo are incident on the hologram photosensitive material 58 as scattered light from the scattering plate 6 made of opal glass, for example. In the example shown in FIG. 4, the hologram recording medium 55 to be produced is a reflection-type and the object beams Lo are incident on the hologram photosensitive material 58 on the opposite side to the reference beams Lr. It is a precondition that the object beams Lo are coherent with the reference beams Lr. Therefore, for example, it is possible to separate laser beams oscillated by the same laser source 61 and use one of the separated ones as the reference beams Lr and the other as the object beams Lo described above.

In the example shown in FIG. 4, a parallel light flux that is parallel with the direction of normal to the plate surface of the scattering plate 6 is incident on the scattering plate 6 and scattered, and then the scatted beams that have passed through the scattering plate 6 are incident on the hologram photosensitive material 58 as the object beams Lo. According to this method, when an isotropic scattering plate available at usually low cost is used as the scattering plate 6, the object beams Lo from the scattering plate 6 can be easily incident on the hologram photosensitive material 58 at roughly constant intensity distribution. Moreover, according to this method, although depending on the degree of scattering by the scattering plate 6, the object beams Lo can be easily incident on respective positions of the hologram photosensitive material 58 at roughly constant intensity from the entire region of a light-emitting surface 6a of the scattering plate 6. In such a case, it is achievable that light beams incident on respective positions of the obtained hologram recording medium 55 reproduce images 5 of the scattering plate 6 at similar brightness and reproduced images 5 of the scattering plate 6 are observed at roughly constant brightness.

As described above, when the hologram photosensitive material 58 is exposed by the reference beams Lr and object beams Lo, interference fringes caused by the interference between the reference beams Lr and object beams Lo are generated and interference fringes of these light beams are recorded in the hologram photosensitive material 58 as some form of pattern, i.e. an refractive index modulation pattern, as one example in a volume hologram. Thereafter, an appropriate post-treatment corresponding to the type of the hologram photosensitive material 58 is applied, thereby obtaining the hologram recording medium 55.

The hologram recording medium 55 in the present embodiment has a plurality of recording areas r1 to rn, so that an interference fringe is formed in each recording area by a technique shown in FIG. 4.

FIG. 5 is a view explaining a state in which an image of a scattering plate is reproduced using interference fringes formed in the hologram recording medium 55 obtained through an exposure process of FIG. 4. As shown in FIG. 5, the hologram recording medium 55 produced with the hologram photosensitive material 58 of FIG. 4 meets its Bragg condition by means of light beams that have the same wavelength as the laser beams used in the exposure process and propagate in a reverse direction of the reference beams Lr along an optical path of the reference beams Lr. Namely, as shown in FIG. 5, a diverging light flux that diverges from a reference point SP located with respect to the hologram recording medium 55 so as to have the same positional relationship as the relative position of the focal point FP in FIG. 4 with respect to the hologram photosensitive material 58 in the exposure process and that has the same wavelength as the reference beams Lr in the exposure process is diffracted by the hologram recording medium 55 as the reproduction illumination light beams La, thereby creating the reproduced image 5 of the scattering plate 6 at a specific location with respect to the hologram recording medium 50 so as to have the same positional relationship as the relative position of the scattering plate 6 in FIG. 4 with respect to the hologram photosensitive material 58 in the exposure process.

In this occasion, reproduction beams Lb. i.e. beams obtained by diffracting the reproduction illumination light beams La by the hologram recording medium 55, for creating the reproduced image 5 of the scattering plate 6 reproduce respective points of the image 5 of the scattering plate 6 as beams propagating in the reverse direction of the optical path of the object beams Lo propagated towards the hologram photosensitive material 58 from the scattering plate 6 in the exposure process. Moreover, as shown in FIG. 4, scattered beams Lo emitted from respective points of the light-emitting surface 6a of the scattering plate 6 in the exposure process are diffused, i.e. spread, to be incident on roughly entire region of the hologram photosensitive material 58. Namely, on respective points of the hologram photosensitive material 58, the object beams Lo from the entire region of the light-emitting surface 6a of the scattering plate 6 are incident. As a result, information of the entire light-emitting surface 6a is recorded at respective points of the hologram recording medium 55. It is therefore possible that beams that form a diverging light flux from the reference point SP and function as the reproduction illumination light beams La are incident on respective points of the hologram recording medium 55 to reproduce the images 5 of the scattering plate 5 having the same contour as one another at the same location, i.e. the illumination zone LZ, respectively.

The light beams incident on the hologram recording medium 55 are diffracted in the direction of the illumination zone LZ, hence useless scattered light can be effectively restricted. Therefore, all of the reproduction illumination beams La incident on the hologram recording medium 55 can be effectively used for creating the image of the scattering plate 6.

Next, the configuration of the irradiation unit 60 that emits coherent light beams to the optical device 50 made of the hologram recording medium 55 described above will be explained. In the example shown in FIGS. 1 to 3, the irradiation unit 60 is provided with the laser source 61 that generates coherent light beams and the scanning device 65 that changes the propagation direction of coherent light beams from the laser source 61.

The laser source 61 emits, for example, visible light. Or a plurality of laser sources 61 that emit laser beams of different wavelength ranges may be used. When a plurality of laser sources 61 are used, it is arranged that the same point on the scanning device 65 is irradiated with a laser beam from each laser source 61. With this arrangement, the hologram recording medium 55 is illuminated with reproduction illumination light beams having illumination colors of the laser sources 61 mixed with one another.

The hologram recording medium 55 is provided with an n number of recording areas r1 to rn so as to correspond to an n number of line images LZ1 to LZn to be created in the illumination zone LZ, respectively. On each of the recording areas r1 to rn, a coherent light beam within the corresponding reflection angle range from the scanning device 65 is incident.

The n number of recording areas r1 to rn can be provided on the hologram recording medium 55 by irradiating each recording area with a reference beam Lr and an object beam Lo to form an interference fringe on each recording area.

The recording areas r1 to rn may not always necessarily be arranged in tight contact with one another but may be arranged with a gap therebetween. If gaps are provided, coherent light beams incident on the gaps are not used for creating line images LZ1 to LZn, however, practically there is no problem. Or interference fringes may be formed so that recording areas next to each other are overlapped with each other.

The line images LZ1 to LZn may also not always necessarily be arranged in tight contact with one another but may be arranged with a gap therebetween. Even if there are some gaps, practically there is no problem as far as uniform plane illumination is possible because of the characteristics of the light guide plate 30. For a similar reason, as far as uniform plane illumination is possible, line images next to each other may be superimposed on each other.

The laser source may be a singe-color laser source or a plurality of laser sources of different colors, for example, red, green and blue. When a plurality of laser sources are used, the laser sources are arranged so that coherent light beams from the laser sources are emitted to a single point on the scanning device 65. With this arrangement, coherent light beams from the laser sources are reflected by the scanning device 65 at reflection angles corresponding to the incident angles of coherent light beams from the laser sources, incident on the hologram recording medium 55, diffracted by the hologram recording medium 55 separately, and superimposed on one another on the illumination zone LZ, thereby having a combined color, for example, white. Or a scanning device 65 may be provided for each laser source.

For example, when illuminating with white, a color as much closer to white as possible may be reproduced by providing another laser source, for example, a laser source that emits light in yellow, other than red, green and blue. Therefore, there is no particular limitation on the type of laser source provided in the irradiation unit 60.

The scanning device 65 changes the propagation direction of a coherent light beam with time to direct the coherent light beam in different directions so that the coherent light beam does not propagate in the same direction. This results in that the coherent light beam, the propagation direction of which is changed by the scanning device 65, scans the incidence surface of the hologram recording medium 55 of the optical device 50.

As described above, since the n number of recording areas r1 to rn are formed on the incidence surface of the hologram recording medium 55, coherent light beams are incident on any of the recording areas in accordance with the incidence direction of the coherent light beams from the scanning device 65.

Figure 6:
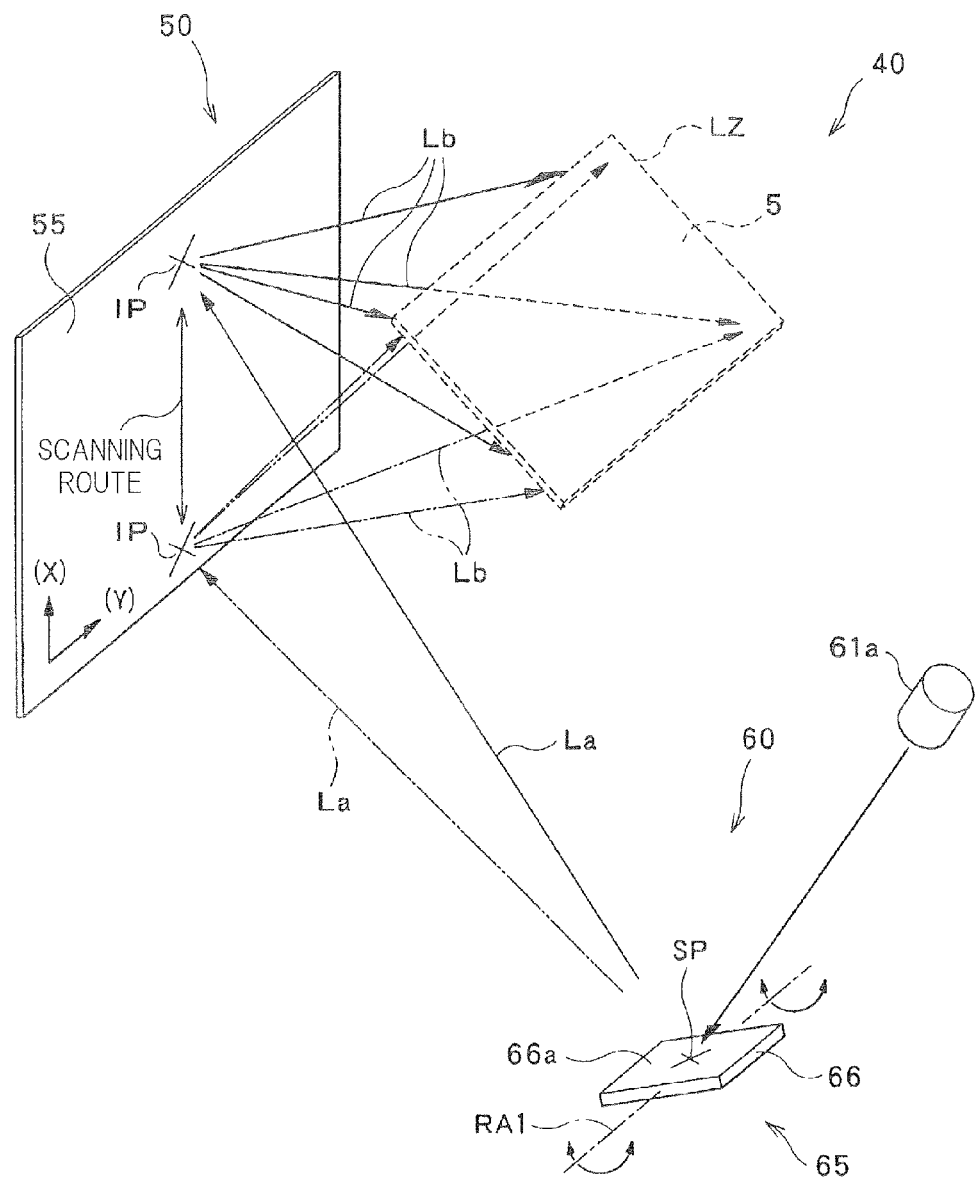
FIG. 6 is a view explaining a scanning route of a scanning device 65.

In the example shown in FIG. 3, the scanning device 65 includes a reflection device 66 having a reflection surface 66a rotatable about one axis line RA1. FIG. 6 is a view explaining a scanning route of the scanning device 65. As understood from FIG. 6, the reflection device 66 has a mirror device that has a mirror as the reflection surface 66a rotatable about one axis line RA1. The mirror device 66 is configured to change the orientation of the mirror 66a to change the propagation direction of the coherent light beams from the laser source 61. In this occasion, as shown in FIG. 3, the mirror device 66 is provided so as to receive the coherent light beams from the laser source 61 roughly at the reference point SP.

A coherent light beam, for which final adjustments were made to its propagation direction by the mirror device 66, can be incident on the hologram recording medium 55 of the optical device 50 as a reproduction illumination light beam La that can become one beam included in a diverging light flux from the reference point SP in FIG. 5. As a result, coherent light beams from the irradiation unit 60 scan the hologram recording medium 55 and coherent light beams incident on respective positions of the hologram recording medium 55 reproduce images 5 of the scattering plate 6 having the same contour on the same location, i.e. the illumination zone LZ.

As shown in FIG. 6, the reflection device 66 is configured to rotate the mirror 66a about one axis line RA1. In the example shown in FIG. 6, the rotation axis line RA1 of the mirror 66a extends in parallel with the y-axis of the x-y axis system, that is, the x-y axis system having the x-y plane in parallel with the surface of the hologram recording medium 55, defined on the surface of the hologram recording medium 55. Then, the mirror 66a rotates about the axis line RA1 that is in parallel with the y-axis of the x-y axis system defined on the surface of the hologram recording medium 55. Therefore, an incidence point IP of a coherent light beam from the irradiation unit 60 on the optical device 50 moves in a reciprocating motion in the direction parallel with the x-axis of the x-y axis system defined on the surface of the hologram recording medium 55. Namely, in the example shown in FIG. 6, the irradiation unit 60 emits a coherent light beam to the optical device 50 to scan the hologram recording medium 55 along a straight route.

The scanning device 65 including the mirror device 66 and other components is, as described above, a member rotatable about at least the axis line Al and configured with a MEMS, for example. The scanning device 65 periodically moves in rotational motion, however, there is no particular limitation on its rotational frequency as far as it can scan with coherent light beams at about 1/30 seconds per one cycle for use, for example, in a backlight apparatus with which a human directly observes or at higher speed in accordance with the type of image to be displayed.

As a practical problem, the hologram photosensitive material 58 may shrink when the hologram recording medium 55 is produced. In such a case, it is preferable to adjust the recording angles of coherent light beams to be entered to the optical device 50 from the irradiation unit 60 under consideration of the shrinkage of the hologram photosensitive material 58. The wavelengths of coherent light beams generated by the laser sources 61 do not need to be precisely the same as the wavelength of the light beam used in the recording process of FIG. 4 but may be roughly the same.

In a similar reason, even if the propagation direction of a light beam to be incident on the hologram recording medium 55 of the optical device 50 does not take precisely the same route as one beam included in a diverging light flux from the reference point SP, an image 5 can be reproduced in the illumination zone LZ. Actually, in the examples shown in FIGS. 3 and 6, the mirror, i.e. reflection plane 66a of the mirror device 66 of the scanning device 65 is inevitably displaced from its rotational axis line RA1. Therefore, when the mirror 66a is rotated about the rotational axis line RA1 that does not pass through the reference point SP, a light beam to be incident on the hologram recording medium 55 may not be one of the beams that form a diverging light flux from the reference point SP. However, practically, an image 5 can be substantially reproduced in a manner that the image 5 is superimposed on the illumination zone LZ by means of coherent lights from the irradiation unit 60 having the shown configuration.

The scanning device 65 may not necessarily be a device for reflecting coherent light beams but a device for refracting or diffracting coherent light beams so that coherent light beams san the optical device 50.

[Effects of Present Embodiment]

Next, the functions of the plane illumination apparatus having the configuration described above will be explained. Firstly, the irradiation unit 60 emits coherent light beams to the optical device 50 so as to successively scan the n number of recording areas r1 to rn in the hologram recording medium 55 of the optical device 50. Specifically, the laser source 61 generates coherent light beams having a specific wavelength that propagate along a unidirection. These coherent light beams are emitted to the scanning device 65 to change their respective propagation directions. More specifically, the coherent light beams propagate towards the hologram recording medium 55 at reflection angles in accordance with incident angles from the laser source 61.

The scanning device 65 makes coherent light beams incident on specific positions on the hologram recording medium 55 at an incident angle that meets the Bragg condition on the respective positions, with the corresponding specific wavelengths. As a result, the coherent light beams incident on the specific positions in the recording area 55 reproduce images 5 of the scattering plate 6 in a manner that the images 5 are superimposed on one another on the entire region of the illumination zone LZ by diffraction caused by interference fringes recorded in the hologram recording medium 55. Namely, the coherent light beams incident on specific positions of the hologram recording medium 55 from the irradiation unit 60 are diffused, i.e. spread, by the optical device 50 to be incident on the entire region in the corresponding area of the illumination zone LZ. For example, a coherent light beam incident on any position in the recording area r1 reproduces line images LZ1 in a manner that the line images LZ1 are superimposed on one another on the entire region of in the corresponding area in the illumination zone LZ.

In this way, the irradiation unit 60 illuminates the illumination zone LZ with coherent light beams. For example, when the laser source 61 has a plurality of laser sources 61 that emit light in different colors, an image 5 of the scattering plate 6 is reproduced in each color on the illumination zone LZ. Therefore, when the laser sources 61 emit light simultaneously, the illumination zone LZ is illuminated with white that is a combination of three colors.

The position of incidence of coherent light beams on the hologram recording medium 55 from the scanning device 65 is shifted with time in each position by the operation of the scanning device 65.

The illumination zone LZ is provided, for example, near the first end face 31a of the light take-out portion 31. Since, the first end face 31a is provided closest to the optical device 50 in the light take-out portion 31, an illumination light beam of the illumination zone LZ propagates towards the second end face 31b while being reflected at the third and fourth end faces 31c and 31d of the light take-out portion 31. One of the third and fourth end faces 31c and 31d, for example, the third end face 31c, is a light take-out surface on which an illumination light beam of the illumination zone LZ is reflected and through which part of the illumination light beam is taken out to the outside. With this configuration, a uniform illumination light beam can be taken out from the entire third end face 31c.

The illumination zone LZ may not necessarily be provided near the first end face 31a closest to the optical device 50 but may be provided inside the light take-out portion 31 or near the second end face 31b farthest from the optical device 50. For example, when the illumination zone LZ is provided near the second end face 31b, a coherent light beam incident on any position in each of the recording areas r1 to rn of the hologram recording medium 55 propagates into the light take-out portion 31 from the first end face 31a as diffused light and reproduces images of a scattering plate superimposed on one another on the entire region in the corresponding area of the illumination zone LZ while being reflected at the third and fourth end faces 31c and 31d or directly propagating without reflection.

As described above, in the present embodiment, a plurality of recording areas r1 to rn are formed on the hologram recording medium 55, an interference fringe is formed on each recording area, and a plurality of line images LZ1 to LZn are created on the illumination zone LZ. This is because it is presumed that the width of the first and second end faces 31a and 31b of the light take-out portion 31 is large, for example, several ten centimeters or more. If the width of the first and second end faces 31a and 31b is large, the width of the illumination zone LZ is also large. However, since the diffusion angle obtained at the hologram recording medium 55 is not so large, the entire region of the illumination zone LZ may not be illuminated if there is only one recording area. Therefore, in the present embodiment, the hologram recording medium 55 is provided with a plurality of recording areas r1 to rn. However, the hologram recording medium 55 may not be provided with a plurality of recording areas r1 to rn if the width of the first and second end faces 31a and 31b of the light take-out portion 31 is sufficiently small so that the entire region of the illumination zone LZ can be covered with one recording area. In this case, coherent light beams emitted to any point on the hologram recording medium 55 reproduce line images in a manner that line images are superimposed on one another on the entire region of the illumination zone LZ.

In the present embodiment, an optical image can be created on the illumination zone LZ with speckles inconspicuous, as explained below.

According to Speckle Phenomena in Optics, Joseph W. Goodman, Roberts & Co. , 2006 cited above, it is effective to integrate parameters such as polarization, phase, angle and time to increase modes. The modes here are speckle patterns with no correlation one anther. For example, when coherent light beams are projected onto the same screen in different directions from a plurality of laser sources 61, modes exist in the same number as the laser sources. Moreover, when coherent light beams are projected onto a screen in different directions per unit of time from the same laser source 61, modes exist by the number of changes in the incidence direction of the coherent light beams during the time that is not covered by the resolution of human eyes. It is assumed that, if there are many of this mode, the interference patterns of light are superimposed on one another and averaged with no correlation, and as a result, speckles to observed by eyes of an observer are inconspicuous.

In the irradiation unit 60 described above, coherent light beams are emitted to the optical device 50 to scan the hologram recording medium 55. Although coherent light beams incident on any positions of the recording areas r1 to rn in the hologram recording medium 55 illuminate the entire region of the corresponding areas of the same illumination zone LZ, the illuminating directions of the coherent light beams to illuminate the illumination zone LZ are different from one another. And, since the position on the hologram recording medium 55 on which a coherent light beam is incident changes with time, the incidence direction of the coherent light beam on the illumination zone LZ also changes with time.

As described above, in the present embodiment, a coherent light beam continuously scans the hologram recording medium 55. Following to this, the incidence direction of a coherent light beam to the illumination zone LZ from the irradiation unit 60 also continuously changes. When the incidence direction of a coherent light beam to the illumination zone LZ from the optical device 50 changes slightly, for example, an angle less than 1°, a speckle pattern generated on the illumination zone LZ changes greatly, resulting in superimposition of speckle patterns with no correlation. In addition, the frequency of a scanning device 65 such as a MEMS mirror and a polygonal mirror actually on the market is usually several hundred Hz or higher and a scanning device 65 of frequency reaching several ten thousands Hz is not rare.

Accordingly, according to the present embodiment, the incidence direction of a coherent light beam changes with time on each position of the illumination zone LZ and this change occurs at a speed that is not covered by the resolution of human eyes. Therefore, if a screen is placed in the illumination zone LZ, speckle patterns generated corresponding to respective scattering patterns are superimposed on one another and averaged to be observed by an observer.

Accordingly, speckles become inconspicuous effectively to an observer who observes an image displayed on the screen.

According to the reason above, in the present embodiment, the illumination zone LZ is provided near the light take-out portion 31. Therefore, speckles also become inconspicuous for illumination light beams taken out from the light take-out portion 31.

Conventionally, speckles observed by humans are not only speckles at the light take-out portion 31 side caused by scattering of coherent light beams at the light take-out portion 31 but also speckles at the optical device 50 side caused by scattering of coherent light beams before incident on the light take-out portion 31. The speckle pattern generated at the optical device 50 side is also recognizable to an observer by being taken out from the light take-out portion 31 to the outside. However, according to the embodiment described above, coherent light beams continuously scan the hologram recording medium 55 and each of the coherent light beams incident on any position of each of the recording areas r1 to rn in the hologram recording medium 55 illuminates the entire region of the corresponding area of the illumination zone LZ. Namely, the hologram recording medium 55 creates new wavefronts different from the prior wavefronts that have formed speckle patterns, that are taken out to the outside in a complex manner and uniformly via the illumination zone LZ and the light take-out portion 31. By the creation of new wavefronts at the hologram recording medium 55, speckle patterns generated at the optical device 50 side become invisible.

As described above, in the present embodiment, the scanning device 65 makes coherent light beams scan the hologram recording medium 55 and coherent light beams emitted from the recording areas r1 to rn in the hologram recording medium 55 are incident on the entire region in the corresponding areas of the illumination zone LZ. With this extremely simple configuration, uniform illumination light beams can be taken out from the entire region of the third end face 31c or the fourth end face 31d of the light take-out portion 31 without speckles conspicuous.

In Speckle Phenomena in Optics, Joseph W. Goodman, Roberts & Co., 2006 mentioned above, a method using a numerical value corresponding to a speckle contrast as a parameter to indicate the degree of speckles generated on a screen is proposed. The speckle contrast is the quantity defined as a value obtained by dividing the standard deviation of variation in intensity actually occurred on a screen by an average value of the intensity when a test-pattern image to originally show uniform intensity distribution is displayed. A larger value of the speckle contrast means a larger degree of generation of speckles on a screen and indicates to an observer that a spotted luminance-unevenness pattern is more remarkable.

FIG. 7 is a view showing results of measuring speckle contrasts in the cases where the hologram recording medium 55 described above was used and not used. FIG. 7(a) shows a result obtained when a laser beam was directly emitted to the illumination zone LZ without using the scanning device 65 and the optical device 50. FIG. 7(b) shows a result obtained when a volume hologram produced having a diffusion angle of 20° was used as the optical device 50. FIG. 7(c) shows a result obtained when a relief diffusion plate was used as the optical device 50. FIG. 7(d) shows a result obtained when a singe-color LED light beam was directly emitted to the illumination zone LZ by using a singe-color LED, instead of the laser source 61, as the irradiation unit 60.

When it is considered that a speckle contrast of 5 or lower is a reference index indicating an allowable speckle noise in a display apparatus or the like, in the present embodiment of the present invention shown in FIG. 7(b), a speckle contrast was lower than 4, and hence extremely favorable result was obtained.

The problem of generation of speckles is practically a problem unique to the case of using a coherent light source of a laser beam or the like, and thus, the problem needs not be considered in the case of an apparatus using an incoherent light source such as an LED. However, according to FIG. 7, the present embodiment is superior to the case using a singe-color LED concerning the speckle contrast. The reason may be that a light diffusion device 21 is not used for illumination for a singe-color LED. As described above, it can be said that the plane illumination apparatus according to the present embodiment sufficiently dealt with the speckle defect.

In addition, according to the present embodiment described above, the following advantages can be obtained.

According to the present embodiment described above, the optical device 50 for making speckles inconspicuous can also function as an optical member for shaping and adjusting the beam shape of a coherent light beam emitted from the irradiation unit 60. Therefore, it is possible to miniaturize and simplify the optical module.

Moreover, according to the present embodiment described above, coherent light beams incident on specific positions in the recording areas r1 to rn of the hologram recording medium 55 create images of the scattering plate 6 in respective colors on the entire region of the corresponding areas of the illumination zone LZ. Therefore, it is possible to utilize all of the light beams diffracted by the hologram recording medium 55 for illumination, thus excellent in utilization efficiency of light beams from the laser source 61.

[Avoidance of Zero-Order Light]

Part of coherent light beams from the irradiation unit 60 is not diffracted by the hologram recording medium 55 but passes though it. This type of light is called zero-order light. When zero-order light is incident on the illumination zone LZ, an abnormal region, i.e. a spotted region, a line region, and a plane region, inevitably appears in which brightness, i.e. intensity, is rapidly increased compared with the surroundings.

When the reflection-type hologram recording medium 55, hereinafter, "reflection-type holograms", is used, the illumination zone LZ and the light take-out portion 31 are not arranged in a propagation direction of zero-order light, hence it is relatively easy to avoid zero-order light. However, when the transmission-type hologram recording medium 55, hereinafter, "transmission-type holograms" is used, in the present embodiment, it is difficult to have a configuration for avoiding zero-order light because the distance from the transmission-type hologram to the first end face is short and the recording areas r1 to rn of the transmission-type hologram are aligned in one axis direction. Therefore, in the case of the transmission-type holograms, it is desirable to raise diffraction efficiency as high as possible to restrict the effects of zero-order light as much as possible.

[Reflection- and Transmission-Type Hologram Recording Media 55]

Reflection-type holograms show higher wavelength selectivity than transmission-type holograms. In other words, in reflection-type holograms, although interference fringes corresponding to different wavelengths are superimposed on one another in layers, a coherent light beam having a desired wavelength can be diffracted by a desired layer only. In addition, reflection-type holograms are excellent in that the influence of zero-order light can be easily removed.

On the other hand, although transmission-type holograms have a wide spectrum range for diffraction and a high acceptable level to the laser source 61, if interference fringes corresponding to different wavelengths are superimposed on one another in layers, layers other than a desired layer also diffract coherent light of a desired wavelength. Therefore, in general, it is difficult to configure transmission-type holograms in a layered structure.

In the plane illumination apparatus of FIGS. 1 and 2, the reflection-type hologram recording medium 55 is provided oblique to the first end face 31a of the light take-out portion 31. When a transmission-type hologram 55 is used, this hologram 55 may be provided roughly parallel with the first end face 31a and a reflection member (not shown) for reflecting again coherent light beams reflected by the scanning device 65 to guide the coherent light beams to the hologram recording medium 55 may be newly provided.

(Irradiation Unit 60)

Figure 8:
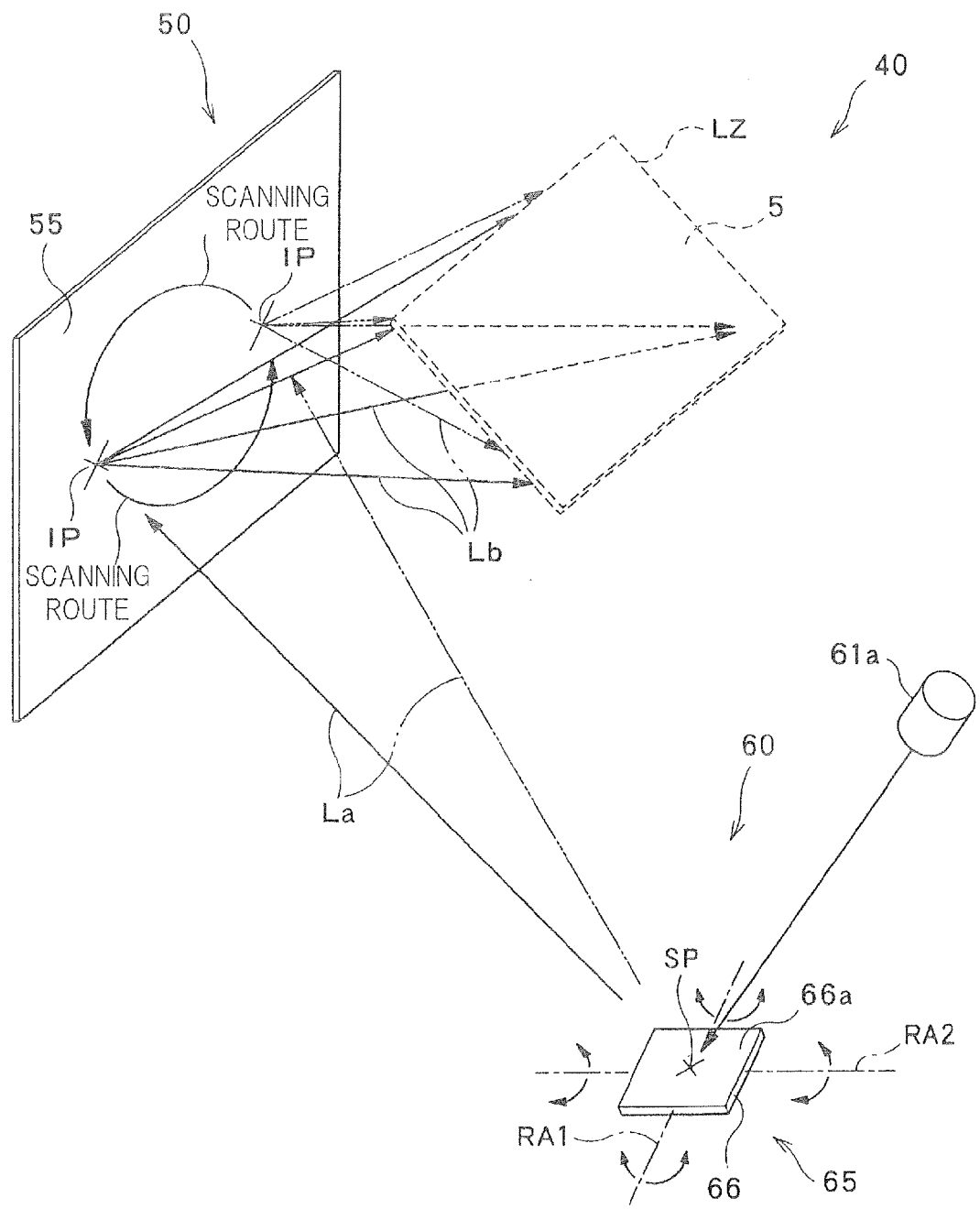
FIG. 8 is a view showing an example of an irradiation unit provided with a scanning device rotatable in two axes directions.

The embodiment described above shows an example in which the irradiation unit 60 includes the laser source 61 and the scanning device 65. In the example, the scanning device 65 includes the one-axis-rotation type mirror device 66 that changes the propagation direction of a coherent light beam by reflection. However, the scanning device 65 is not limited thereto. As shown in FIG. 8, the scanning device 65 may be configured so that the mirror, i.e. reflection plane 66a, of the mirror device 66 can rotate about the first rotation axis line RA1 as well as about a second rotation axis line RA2 intersecting the first rotation axis line RA1. In the example shown in FIG. 8, the second rotation axis line RA2 of the mirror 66a is perpendicular to the first rotation axis line RA1 which is extended in parallel to the Y axis of the XY coordinate system defined on the plate plane of the hologram recording medium 55. Then, since the mirror 66a can rotate about both of the first axis line RA1 and the second axis line RA2, the incidence point IP of a coherent light beam from the irradiation unit 60 incident on the optical device 50 can be shifted on the plate plane of the hologram recording medium 55 in two-dimensional directions. Therefore, as an example, as shown in FIG. 8, the incidence point IP of a coherent light beam incident on the optical device 50 can be shifted along a circumference.

Moreover, the scanning device 65 may include two or more mirror devices 66. In this case, although the mirror 66a of the mirror device 66 can rotate about only a single axis line, the incidence point IP of a coherent light beam from the irradiation unit 60 incident on the optical device 50 can be shifted on the plate plane of the hologram recording medium 55 in two-dimensional directions.

As a concrete example of the mirror device 66 included in the scanning device 65, there are a MEMS mirror, a polygonal mirror, and the like.

Moreover, the scanning device 65 may be configured to include other devices other than a reflection device, for example, the mirror device 66 described above, which changes the propagation direction of a coherent light beam by reflection. For example, the scanning device 65 may include a refraction prism, a lens, etc.

Essentially, the scanning device 65 is not a necessary component. The light source 61 of the irradiation unit 60 may be configured so that they can be displaced, i.e. moved, oscillated, and rotated, with respect to the optical device 50. Coherent light beams emitted from the light source 61 may scan the hologram recording medium 55 in accordance with the displacement of the light sources 61 with respect to the optical device.

Moreover, although the description hereinbefore is made on condition that the light source 61 of the irradiation unit 60 oscillates a laser beam shaped into a line beam, the preset invention is not limited thereto. Particularly, in the embodiments described above, coherent light beams emitted to respective positions of the optical device 50 are shaped by the optical device 50 into a light flux which is incident on the entire region of the illumination region LZ. Therefore, no problem occurs even if coherent light beams emitted from the light source 61 of the irradiation unit 60 to the optical device 50 are not accurately shaped. For this reason, coherent light beams generated from the light source 61 may be diverging light. In addition, the shape of coherent light beams, in cross section, generated from the light sources 61 may be an ellipse or the like instead of a circle. In addition, the transverse mode of coherent light beams generated from the light source 61 may be a multi-mode.

In addition, when the light source 61 generates a diverging light flux, coherent light beams are incident on the hologram recording medium 55 of the optical device 50 not on a spot but on a region having a certain area. In this case, light beams which are diffracted by the hologram recording medium 55 and incident on respective positions of the illumination region LZ are angularly-multiplexed. In other words, in each instant, on respective positions of the illumination region LZ, coherent light beams are incident from directions within a certain angle range. Due to the angle-multiplexing, it is possible to more effectively make speckles inconspicuous.

Figure 9:
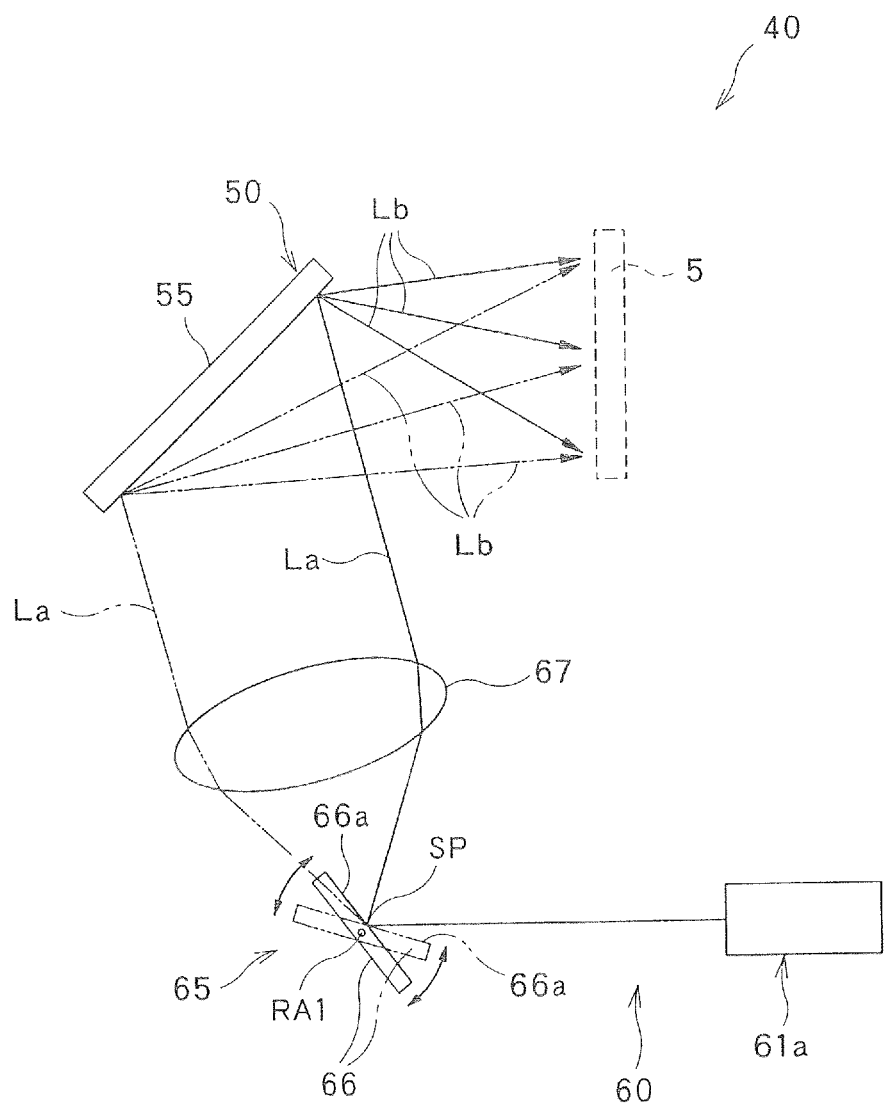
FIG. 9 is a view showing an example of making a parallel beam incident on the hologram recording medium 55.

Moreover, in the embodiments described above, although the example is described in which the irradiation unit 60 emits a coherent light beam to the optical device 50 so that the coherent light beam traces the optical path of one beam included in a light flux, the present invention is not limited thereto. For example, in the above embodiments, as shown in FIG. 9, the scanning device 65 may further include a condenser lens 67 disposed at the downstream side of the mirror device 66 along the optical path of a coherent light beam. In this case, a light beam from the mirror device 66, which propagates along the optical path of light beams that form a light flux, becomes a light beam that propagates in a certain direction through the condenser lens 67. In other words, the irradiation unit 60 emits a coherent light beam to the optical device 50 so that the coherent light beam traces the optical path of one beam included in a light flux. In this kind of example, instead of a converging light flux described above, a parallel light flux is used as the reference light beam Lr in the recording process in the production of the hologram recording medium 55. The hologram recording medium 55 described above can be more simply produced and replicated.

(Optical Device 50)

In the embodiments described above, although the example in which the optical device 50 is configured with a reflection-type volume hologram recording medium 55 using photopolymer has been described, the present invention is not limited thereto. Moreover, the optical device 50 may include a volume hologram recording medium that is a type in which recording is performed by using a photosensitive medium including a silver halide material. Moreover, the optical device 50 may include a transmission-type volume hologram recording medium 55 or a relief-type, i.e. emboss-type hologram recording medium 55.

With respect to the relief-type, i.e. emboss-type, hologram recording medium, a hologram interference fringe is recorded using a convex-concave structure of the surface thereof. However, in the case of the relief-type hologram recording medium, scattering due to the convex-concave structure of the surface may also cause generation of new speckles, hence in this respect, the volume hologram recording medium is preferable. In the case of the volume hologram recording medium, a hologram interference fringe is recorded as a refractive index modulation pattern, i.e. refractive index distribution, of an inner portion of the medium, hence there is no influence of scattering because of the convex-concave structure of the surface.

However, even when the volume hologram recording medium is used, a type in which recording is performed using a photosensitive medium including a silver halide material may become a cause of generating new speckles due to scattering of silver halide particles. In this respect, the volume hologram recording medium using a photopolymer is preferable as the hologram recording medium 55.

Moreover, in the recording process shown in FIG. 4, although a so-called Fresnel-type hologram recording medium 55 is produced, a Fourier transform-type hologram recording medium 55 which can be obtained through recording using lenses may be produced. When the Fourier transform-type hologram recording medium is used, lenses can also be used for image reproduction.

In addition, a striped pattern, i.e. refractive index modulation pattern or convex-concave pattern, which is to be formed on the hologram recording medium 55 may be designed by using a computer based on a planned wavelength or incidence direction of a reproduction illumination light beam La, a shape or position of an image to be reproduced, and the like, without use of an actual object light beam Lo and reference light beam Lr. The hologram recording medium 55 obtained in this manner is called a computer generated hologram recording medium. Moreover, when a plurality of coherent light beams having mutually different wavelength ranges are emitted from the irradiation unit 60 in a similar manner in the modification described above, the hologram recording medium 55 as a computer generated hologram recording medium may be partitioned two-dimensionally into a plurality of regions provided corresponding to coherent light beams of respective wavelength ranges so that the coherent light beams of the respective wavelength ranges are diffracted in the corresponding regions to reproduce images.

Moreover, in the embodiments described above, although the example is described in which the optical device 50 includes the hologram recording medium 55 by which coherent light beams emitted to respective positions thereof are spread to illuminate the entire region of the illumination region LZ, the present invention is not limited thereto. Instead of the hologram recording medium 55 or in addition to the hologram recording medium 55, the optical device 50 may include a lens array as an optical device by which the propagation directions of coherent light beams incident on respective positions thereof are changed and the coherent light beams are diffused to illuminate the entire region of the illumination region LZ. As a concrete example of the lens array, a total reflection-type or refraction-type Fresnel screen having a diffusing function, a fly-eye lens, and the like may be exemplified. In this type of illumination apparatus 40, the irradiation unit 60 and the optical device 50 may be configured so that the irradiation unit 60 emits coherent light beams to the optical device 50 so that the coherent light beams scan the lens array and the propagation directions of the coherent light beams incident on respective positions of the optical device 50 from the irradiation unit 60 are changed by the lens array, then the coherent light beams having the propagation directions changed illuminate the illumination region LZ, thus effectively making speckles inconspicuous.

(Illuminating Method)

In the embodiments described above, an example is shown in which the irradiation unit 60 is configured to be able to scan the optical device 50 in a one-dimensional direction with coherent light beams and the hologram recording medium 55 or the lens array of the optical device 50 is configured to diffuse, i.e. spread and diverge the coherent light beams incident on respective positions of the hologram recording medium 55 in a two-dimensional direction, so that the illumination apparatus 40 illuminates the two-dimensional illumination region LZ. However, as described above, the present invention is not limited to such example. For example, the irradiation unit 60 may be configured to be able to scan the optical device 50 in a two dimensional direction with coherent light beams and the hologram recording medium 55 or the lens array of the optical device 50 may be configured to diffuse, i.e. spread and diverge, the coherent light beams incident on respective positions of the hologram recording medium 55 in a two-dimensional direction, so that the illumination apparatus 40 illuminates the two-dimensional illumination region LZ, as shown in FIG. 8.

Moreover, as already described, the irradiation unit 60 may be configured to be able to scan the optical device 50 in a one-dimensional direction with coherent light beams and the hologram recording medium 55 or the lens array of the optical device 50 may be configured to diffuse, i.e. spread and diverge, the coherent light beams incident on respective positions of the hologram recording medium 55 in a one-dimensional direction, so that the illumination apparatus 40 illuminates the one-dimensional illumination region LZ. In this configuration, the scanning direction of a coherent light beam from the irradiation unit 60 and the diffusing direction, i.e. spreading direction, by the hologram recording medium 55 or the lens array of the optical device may be parallel with each other.

Furthermore, the irradiation unit 60 may be configured to be able to scan the optical device 50 in a one- or two-dimensional direction with coherent light beams and the hologram recording medium 55 or the lens array of the optical device 50 may be configured to diffuse, i.e. spread and diverge, the coherent light beams incident on respective positions of the hologram recording medium 55 in a one-dimensional direction. In this configuration, as already described, the optical device 50 may have a plurality of hologram recording media 55 or lens arrays to illuminate illumination zones LZ corresponding to the hologram recording media 55 or lens arrays successively, so that the illumination apparatus 40 illuminates a two-dimensional region. In this occasion, the illumination zones LZ may be successively illuminated at a speed felt like as if simultaneously illuminated for human eyes or at a low speed so that human eyes can recognize that the illumination zones LZ are successively illuminated. In other words, the recording areas r1 to rn described above may be formed by using one hologram recording medium 55 or a plurality of recording media may be produced by using different hologram recording media 55, respectively.

The present invention is not limited to the embodiments described above but includes various modifications conceivable by those skilled in the art. The effects of the present invention are also not limited to those described above.

Namely, various additions, modifications and partial omissions may be made without departing from the conceptual idea and gist of present invention derived from those defined in the accompanying claims and their equivalents.

The invention claimed is:

1. A plane illumination apparatus comprising:
an optical device configured to be capable of diffusing coherent light beams from respective points to an entire region of the corresponding areas in an illumination zone and to change an incident direction of the coherent light beams incident on respective points of the illumination zone with time so that speckle patterns on the illumination zone are superimposed on one another and averaged;
an irradiation unit configured to irradiate the coherent light beams to the optical device so that the coherent light beams scan a surface of the optical device; and
a light guide plate configured to make coherent light beams that are reflected at a surface of the optical device or that have passed through the optical device propagate and to take out the coherent light beams to outside;
wherein the irradiation unit makes the coherent light beams scan the surface of the optical device by changing propagation directions of the coherent light beams;
wherein the light guide plate comprises a light take-out portion configured to take out coherent light beams to outside while making coherent light beams propagate between a first end face on which coherent light beams from the optical device are incident and a second end face that is provided to face the first end face;
wherein the illumination zone is provided inside the light take-out portion or along the first end face, or along the second end face; and
wherein the irradiation unit comprises
a light source to emit coherent light beams, and
a scanning device to make the coherent light beams emitted from light source perform scanning on a surface of the optical device by changing propagation directions of the coherent light beam.

2. The plane illumination apparatus of claim 1, wherein the optical device is provided in contact with one end face of the light guide plate; and
wherein coherent light beams diffused by the optical device are incident on the one end face of the light guide plate and reflected totally at two opposing surfaces of the light guide plate, or the coherent light beams are directly incident on the first end face of the light guide plate.

3. The plane illumination apparatus of claim 1, wherein the optical device is provided apart from the light guide plate; and
wherein at least part of coherent light beams diffused by the optical device is incident on the first end face of the light guide plate.

4. The plane illumination apparatus of claim 1, wherein the optical device comprises a plurality of recording areas that are scanned by coherent light beams having propagation directions changed within different angle ranges by the irradiation unit;
wherein the illumination zone comprises a plurality of image reproduction areas corresponding to the plurality of recording areas, respectively;
wherein the plurality of recording areas correspond to the plurality of image reproduction areas, respectively; and
wherein an interference fringe is recorded in each of the plurality of recording areas, to reproduce an image of a reference member on the entire region in the corresponding image reproduction area.

5. The plane illumination apparatus of claim 4, wherein the light guide plate comprises a third end face and a fourth end face that are connected to the first and second end faces and provided to face each other; and
wherein the plurality of image reproduction areas are provided next to one another or overlapped one another partially so as to be irradiated with light of uniform brightness from the third or the fourth end face.

6. The plane illumination apparatus of claim 4, wherein the plurality of recording areas are configured by using one hologram recording medium.

7. The plane illumination apparatus of claim 4, wherein the plurality of recording areas are configured by using different hologram recording media, respectively.

8. The plane illumination apparatus of claim 1, wherein the light guide plate comprises a third end face that is connected to the first and second end faces and to which light of uniform brightness from the light take-out portion is emitted, a fourth end face that faces the third end face, and a fifth and a sixth end face that are connected to the first to fourth end faces, at least one of the second, fifth and sixth end faces having a mirror surface for reflecting coherent light beams incident and propagating from the first end face and propagating to the mirror surface.

9. The plane illumination apparatus of claim 1, wherein the optical device is a reflection-type hologram recording medium provided at the first end face.

10. The plane illumination apparatus of claim 1, wherein the optical device is a transmission-type hologram recording medium.

11. A backlight apparatus provided with a plane illumination apparatus, the plane illumination apparatus comprising:
an optical device configured to be capable of diffusing coherent light beams from respective points to an entire region of the corresponding areas in an illumination zone and to change an incident direction of the coherent light beams incident on respective points of the illumination zone with time so that speckle patterns on the illumination zone are superimposed on one another and averaged;
an irradiation unit configured to irradiate the coherent light beams to the optical device so that the coherent light beams scan a surface of the optical device; and
a light guide plate configured to make coherent light beams that are reflected at the surface of the optical device or that passed through the optical device propagate and to take out the coherent light beams to outside;
wherein the irradiation unit makes the coherent light beams scan the surface of the optical device by changing propagation directions of the coherent light beams;
wherein the light guide plate comprises a light take-out portion configured to make coherent light beams propagate between a first end face on which coherent light beams from the optical device incident and a second end face that is provided to face the first end face, and to take out coherent light beams to outside;
wherein the illumination zone is provided inside the light take-out portion or along the first end face, or along the second end face; and
wherein the irradiation unit comprises
a light source to emit coherent light beams, and
a scanning device to make the coherent light beams emitted from light source perform scanning on a surface of the optical device by changing propagation directions of the coherent light beam.

* * * * *